US012696900B2

(12) United States Patent
Skillman et al.

(10) Patent No.: US 12,696,900 B2
(45) Date of Patent: Aug. 4, 2026

(54) CROP ENHANCEMENT

(71) Applicant: SYNGENTA CROP PROTECTION AG, Basel (CH)

(72) Inventors: Stephen Wilson Skillman, Basel (CH); Myriem El Qacemi, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 555 days.

(21) Appl. No.: 17/997,416

(22) PCT Filed: Apr. 19, 2021

(86) PCT No.: PCT/EP2021/060106
§ 371 (c)(1),
(2) Date: Oct. 28, 2022

(87) PCT Pub. No.: WO2021/219423
PCT Pub. Date: Nov. 4, 2021

(65) Prior Publication Data

US 2023/0165253 A1 Jun. 1, 2023

(30) Foreign Application Priority Data

Apr. 29, 2020 (EP) .................................... 20172180
Sep. 23, 2020 (EP) .................................... 20197626

(51) Int. Cl.
*A01N 43/80* (2006.01)
*A01N 37/22* (2006.01)
*A01N 43/56* (2006.01)

(52) U.S. Cl.
CPC ............. *A01N 43/80* (2013.01); *A01N 37/22* (2013.01); *A01N 43/56* (2013.01)

(58) Field of Classification Search
CPC ......... A01N 43/80; A01N 37/22; A01N 43/56
See application file for complete search history.

(56) References Cited

U.S. PATENT DOCUMENTS

2015/0208655 A1* 7/2015 El Qacemi ........... G06Q 30/018
705/317

FOREIGN PATENT DOCUMENTS

EP 3586630 A1 1/2020
WO 2010069881 A2 6/2010
(Continued)

OTHER PUBLICATIONS

EPO; App. No. EP20172180.0; Extended European Search Report mailed on Jan. 15, 2021.
(Continued)

*Primary Examiner* — Trevor Love
(74) *Attorney, Agent, or Firm* — BakerHostetler; Toni-Junell Herbert

(57) ABSTRACT

The present invention relates to a method of enhancing a crop by applying to plants, plant parts, plant propagation material or a plant growing locus, a compound of formula (I), which is a compound of formula (Ia), (Ib), (Ic), (Id), (Ie) or (If): where each $R_1$, $R_2$ and $R_3$ is independently selected from H, Cl, F, Br and $CF_3$; each $R_4$ is independently selected from $CH_3$, Cl, Br and $CF_3$; and each $R_5$ is independently selected from where $R_6$ and $R_7$ are each selected from Cl, Br, $CH_3$, $CH_2CH_3$, $CF_3$ and $OCF_2H$; $R_8$ is selected from F and $OCH_3$; $R_9$ is selected from H, $CH_3$ and $CH_2CH_3$; and $R_{10}$ is phenyl optionally substituted by F or Cl; where $R_{11}$ and $R_{12}$ are each selected from Cl, Br, $CH_3$, $CH_2CH_3$, $CF_3$ and $OCF_2H$; each $R_{13}$ is independently selected from Cl and Br, each $R_{14}$ is independently selected H, $CH_3$ and $CH_2CH_3$; each $R_{15}$ is independently selected from H and CN; and each X is independently selected from CH and N; or a composition comprising a compound of formula (I).

(Ia)

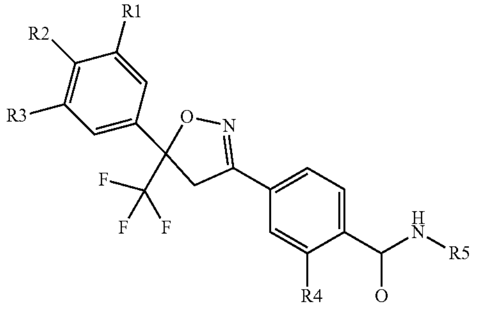

(Ib)

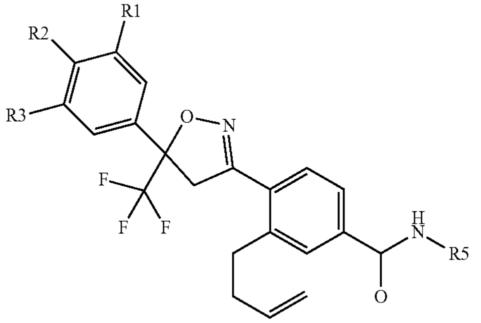

(Ic)

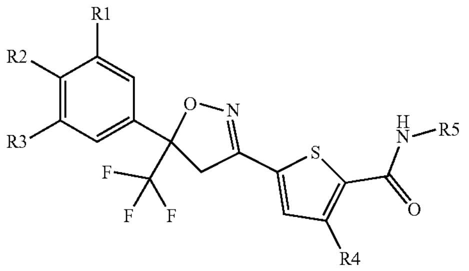

(Continued)

-continued

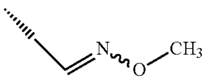

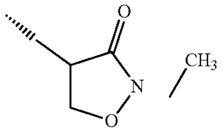

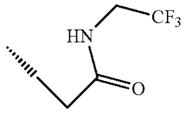

and

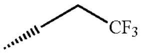

(Id)

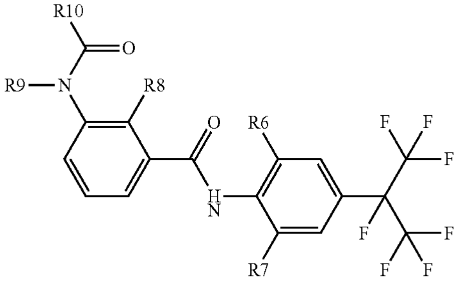

(Ie)

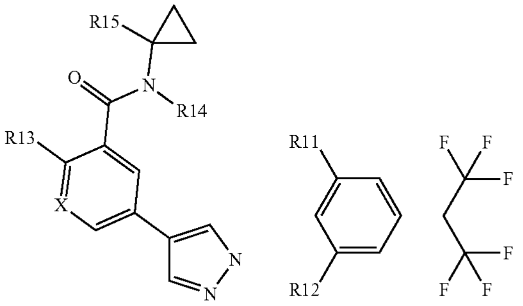

-continued (If)

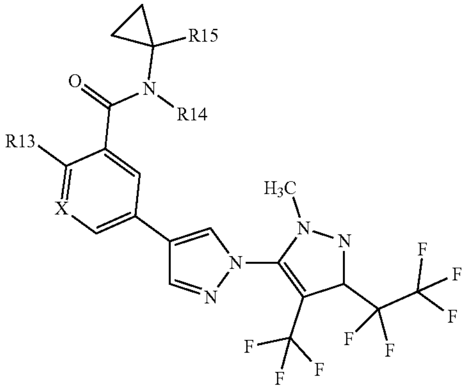

18 Claims, No Drawings

(56) References Cited

FOREIGN PATENT DOCUMENTS

| | | | | |
|---|---|---|---|---|
| WO | 2011/067272 A1 | | 6/2011 | |
| WO | 2016020441 A1 | | 2/2016 | |
| WO | 2018197466 A1 | | 11/2018 | |
| WO | 2019170690 A1 | | 9/2019 | |
| WO | WO2021007545 | * | 1/2021 | ............. A01N 43/22 |

OTHER PUBLICATIONS

EPO; App. No. EP20172180.0; Partial European Search Report mailed on Sep. 25, 2020.
WIPO; App. No. PCT/EP/2021/060106; International Search Report and Written Opinion dated Sep. 22, 2021.

* cited by examiner

CROP ENHANCEMENT

CROSS-REFERENCE TO RELATED APPLICATIONS

This application is a National Stage Entry under 35 U.S.C. § 371 of International Application No. PCT/EP2021/060106, filed Apr. 19, 2021, which claims priority to EP 20197626.3, filed Sep. 23, 2020, and EP 20172180.0, filed Apr. 29, 2020, the contents of which are all incorporated herein by reference.

The present invention relates to a method of crop enhancement, in particular to a method of enhancing crop plants by applying to the plants, plant parts, plant propagation material or a plant growing locus, a compound of formula (I), and to the use of said compound for enhancing crops.

Certain methods of crop enhancement are described in the literature. These methods are usually based on conventional fertilising but some also rely on chemicals originally developed for other uses, for example, the insecticide fipronil has been reported e.g. to enhance overall root system and root hair development, increase tiller number and productivity, increase photosynthetic capacity (plant greenness), increase leaf area and plant height and stimulate early flowering and grain maturation and the fungicide pyraclostrobin has been reported to improve plant health e.g. to improve the tolerance to environmental stresses.

The present invention provides a method of enhancing a crop by applying to plants, plant parts, plant propagation material or a plant growing locus, a compound of formula (I) which is a compound of formula (Ia), (Ib), (Ic), (Id), (Ie) or (If):

(Ia)

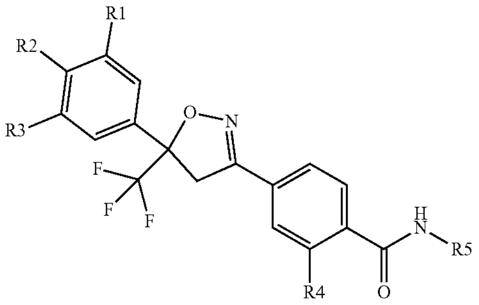

(Ib)

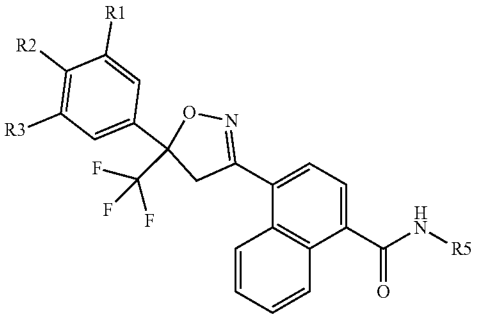

-continued (Ic)

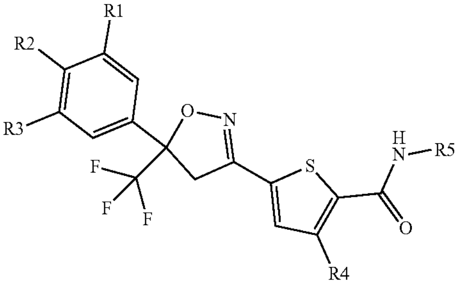

where each $R_1$, $R_2$ and $R_3$ is independently selected from H, Cl, F, Br and $CF_3$;

each $R_4$ is independently selected from $CH_3$, Cl, Br and $CF_3$; and each $R_5$ is independently selected from

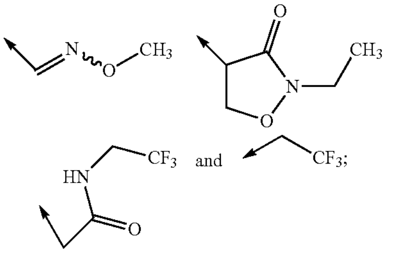

and (Id)

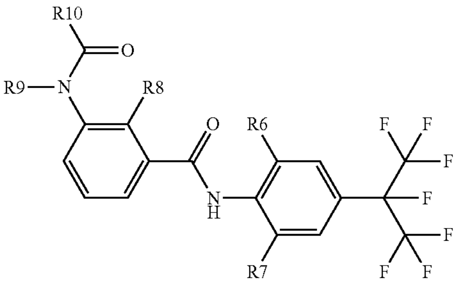

where $R_6$ and $R_7$ are each independently selected from Cl, Br, $CH_3$, $CH_2CH_3$, $CF_3$ and $OCF_2H$;

$R_8$ is selected from F and $OCH_3$;

$R_9$ is selected from H, $CH_3$ and $CH_2CH_3$; and $R_{10}$ is phenyl optionally substituted by F or Cl;

(Ie)

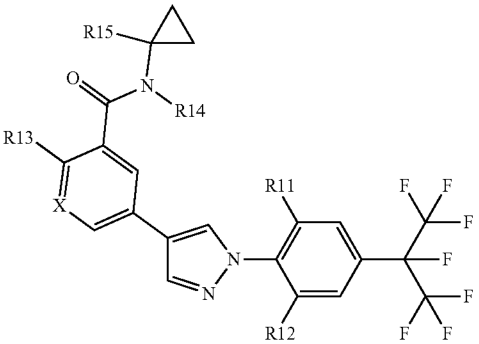

-continued (If)

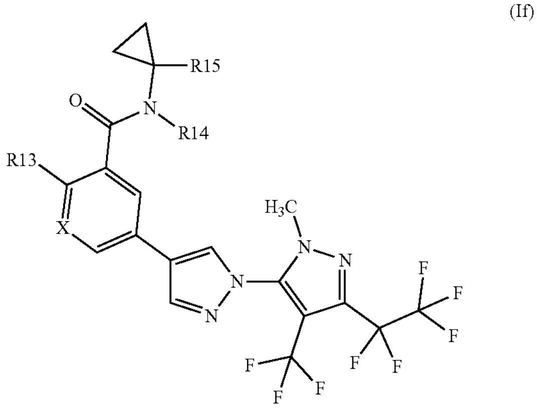

where $R_{11}$ and $R_{12}$ are each independently selected from Cl, Br, $CH_3$, $CH_2CH_3$, $CF_3$ and $OCF_2H$;

each $R_{13}$ is independently selected from Cl and Br;

each $R_{14}$ is independently selected H, $CH_3$ and $CH_2CH_3$;

each $R_{15}$ is independently selected from H and CN; and each X is independently selected from CH and N;

or a composition comprising a compound of formula (I).

Suitably, when the compound of formula (I) is a compound of formula (Ia), $R_1$, $R_2$ and $R_3$ are each independently selected from H, Cl and F;

$R_4$ is $CH_3$; and $R_5$ is selected from

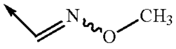 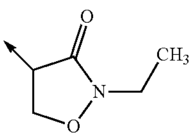 and 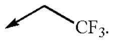

More suitably, when the compound of formula (I) is a compound of formula (Ia), $R_1$, $R_2$ and $R_3$ are each independently selected from Cl and F.

Suitably, when the compound of formula (I) is a compound of formula (Ib), $R_1$, $R_2$ and $R_3$ are each independently selected from H, Cl and $CF_3$; and $R_5$ is

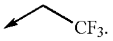

Suitably, when the compound of formula (I) is a compound of formula (Ic), $R_1$, $R_2$ and $R_3$ are each independently selected from Cl and F;

and $R_5$ is

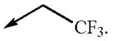

More suitably, when the compound of formula (I) is a compound of formula (Ic), $R_1$, $R_2$ and $R_3$ are each Cl.

Suitably, when the compound of formula (I) is a compound of formula (Id), $R_6$ and $R_7$ are independently selected from Cl, Br and $CF_3$;

$R_8$ is F;

$R_9$ is $CH_3$; and $R_{10}$ is phenyl.

More suitably, when the compound of formula (I) is a compound of formula (Id), $R_6$ and $R_7$ are independently selected from Br and $CF_3$.

Suitably, when the compound of formula (I) is a compound of formula (Ie), $R_{11}$ and $R_{12}$ are each independently selected from Cl and Br;

$R_{13}$ is Cl;

$R_{14}$ is $CH_3$ or $CH_2CH_3$;

$R_{15}$ is H; and

X is N.

More suitably, when the compound of formula (I) is a compound of formula (Ie), $R_{11}$ and $R_{12}$ are both Cl.

Suitably, when the compound of formula (I) is a compound of formula (If), $R_{13}$ is Cl;

$R_{14}$ is H or $CH_3$;

$R_{15}$ is CN; and

X is CH.

More suitably, when the compound of formula (I) is a compound of formula (If), $R_{14}$ is H. Even more suitably, the compound of formula (I) is selected from fluxametamide, isocycloseram, fluralaner, afoxolaner, lotilaner, broflanilide, tigolaner and the compound (Ig).

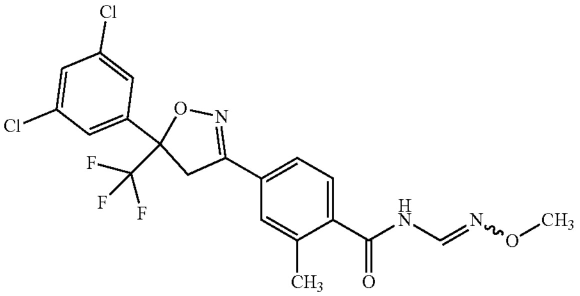

Fluxametamide

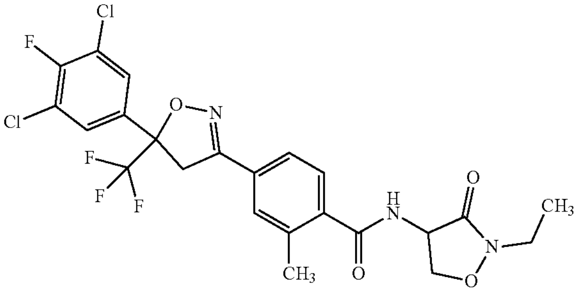

Isocycloseram

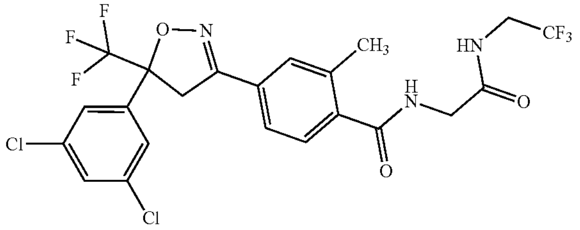

Fluralaner

-continued

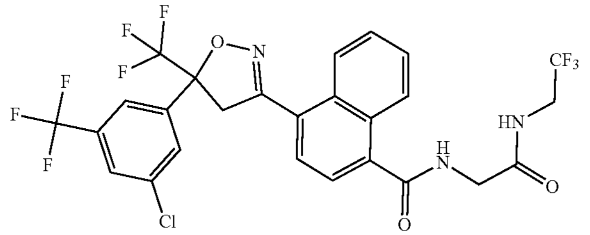

Afoxolaner

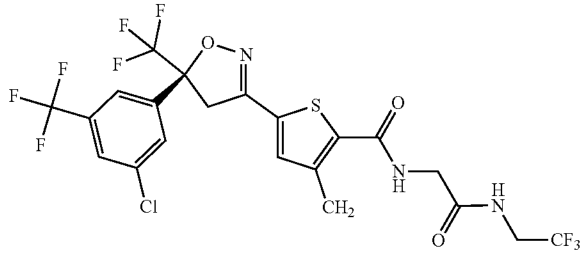

Lotilaner

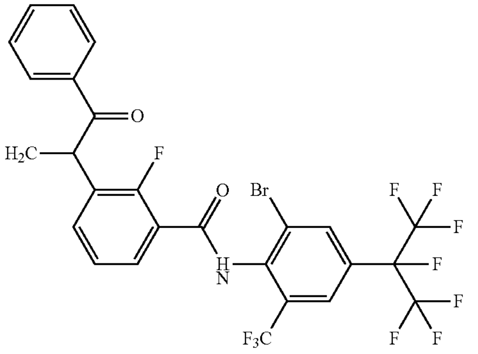

Broflanilide (Ig)

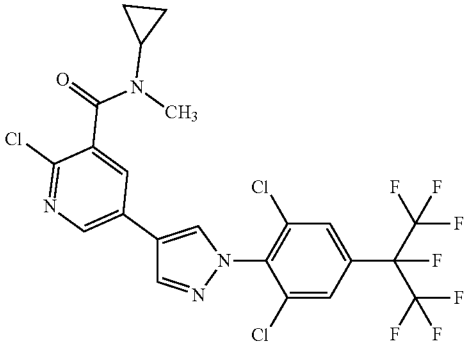

-continued

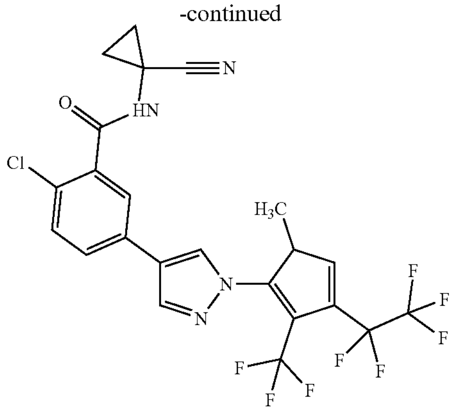

Tigolaner

Most suitably, the compound of formula (I) is isocycloseram.

The present invention also provides the use of a compound of formula (I) or a composition comprising a compound of formula (I) for enhancing a crop.

The invention covers any isomers and mixtures thereof in any ratio.

According to the present invention, 'crop enhancement' or 'enhancing crops' means an improvement in plant vigour, an improvement in plant quality, improved tolerance to stress factors and/or improved input use efficiency.

According to the present invention, an 'improvement in plant vigour' means that certain traits are improved qualitatively or quantitatively when compared with the same trait in a control plant which has been grown under the same conditions in the absence of the method of the invention. Such traits include, but are not limited to, early and/or improved germination, improved emergence, the ability to use less seeds, increased root growth, a more developed root system, increased root nodulation, increased shoot growth, increased tillering, stronger tillers, more productive tillers, increased or improved plant stand, less plant verse (lodging), an increase and/or improvement in plant height, an increase in plant weight (fresh or dry), bigger leaf blades, greener leaf colour, increased pigment content, increased photosynthetic activity, earlier flowering, longer panicles, early grain maturity, increased seed, fruit or pod size, increased pod or ear number, increased seed number per pod or ear, increased seed mass, enhanced seed filling, less dead basal leaves, delay of senescence, improved vitality of the plant, increased levels of amino acids in storage tissues and/or less inputs needed (e.g. less fertiliser, water and/or labour needed). A plant with improved vigour may have an increase in any of the aforementioned traits or any combination or two or more of the aforementioned traits.

According to the present invention, an 'improvement in plant quality' means that certain traits are improved qualitatively or quantitatively when compared with the same trait in a control plant which has been grown under the same conditions in the absence of the method of the invention. Such traits include, but are not limited to, improved visual appearance of the plant, reduced ethylene (reduced production and/or inhibition of reception), improved quality of harvested material, e.g. seeds, fruits, leaves, vegetables (such improved quality may manifest as improved visual appearance of the harvested material), improved carbohydrate content (e.g. increased quantities of sugar and/or starch, improved sugar acid ratio, reduction of reducing sugars, increased rate of development of sugar), improved protein content, improved oil content and composition, improved nutritional value, reduction in anti-nutritional compounds, improved organoleptic properties (e.g. improved taste) and/or improved consumer health benefits (e.g. increased levels of vitamins and anti-oxidants)), improved post-harvest characteristics (e.g. enhanced shelf-life and/or storage stability, easier processability, easier extraction of compounds), more homogenous crop development (e.g. synchronised germination, flowering and/or fruiting of plants), and/or improved seed quality (e.g. for use in following seasons). A plant with improved quality may have an increase in any of the aforementioned traits or any combination or two or more of the aforementioned traits.

According to the present invention, an 'improved tolerance to stress factors' means that certain traits are improved qualitatively or quantitatively when compared with the same trait in a control plant which has been grown under the same conditions in the absence of the method of the invention. Such traits include, but are not limited to, an increased tolerance and/or resistance to abiotic stress factors which cause sub-optimal growing conditions such as drought (e.g. any stress which leads to a lack of water content in plants, a lack of water uptake potential or a reduction in the water supply to plants), cold exposure, heat exposure, osmotic stress, UV stress, flooding, increased salinity (e.g. in the soil), increased mineral exposure, ozone exposure, high light exposure and/or limited availability of nutrients (e.g. nitrogen and/or phosphorus nutrients). A plant with improved tolerance to stress factors may have an increase in any of the aforementioned traits or any combination or two or more of the aforementioned traits. In the case of drought and nutrient stress, such improved tolerances may be due to, for example, more efficient uptake, use or retention of water and nutrients.

According to the present invention, an 'improved input use efficiency' means that the plants are able to grow more effectively using given levels of inputs compared to the grown of control plants which are grown under the same conditions in the absence of the method of the invention. In particular, the inputs include, but are not limited to fertiliser (such as nitrogen, phosphorous, potassium, micronutrients), light and water. A plant with improved input use efficiency may have an improved use of any of the aforementioned inputs or any combination of two or more of the aforementioned inputs.

Other crop enhancements of the present invention include a decrease in plant height, or reduction in tillering, which are beneficial features in crops or conditions where it is desirable to have less biomass and fewer tillers.

Any of or all the above crop enhancements may lead to an improved yield by improving, for example, plant physiology, plant growth and development and/or plant architecture. In the context of the present invention 'yield' includes, but is not limited to, (i) an increase in biomass production, grain yield, starch content, oil content and/or protein content, which may result from (a) an increase in the amount produced by the plant per se or (b) an improved ability to harvest plant matter, (ii) an improvement in the composition of the harvested material (e.g. improved sugar acid ratios, improved oil composition, increased nutritional value, reduction of anti-nutritional compounds, increased consumer health benefits) and/or (iii) an increased/facilitated ability to harvest the crop, improved processability of the crop and/or better storage stability/shelf life. Increased yield of an agricultural plant means that, where it is possible to take a quantitative measurement, the yield of a product of the respective plant is increased by a measurable amount over the yield of the same product of the plant produced under the same conditions, but without application of the present invention. According to the present invention, it is preferred that the yield be increased by at least 0.5%, preferably 1%, more preferably 2%, yet more preferably 4% or more. Even more preferred is an increase in yield of at least about 5%, 10%, 15% or 20% or more.

Any, or all, of the above crop enhancements may also lead to an improved utilisation of land, that is land which was previously unavailable or sub-optimal for cultivation may become available. For example, plants which show an increased ability to survive in drought conditions, may be able to be cultivated in areas of sub-optimal rainfall, for example on the fringe of a desert or even the desert itself.

In one embodiment, the present invention provides a method of improving the tolerance of crops to stress factors by applying to the plants, plant parts, plant propagation material, or a plant growing locus, a compound of formula (I). The stress factor may be selected from drought, cold exposure, heat exposure, osmotic stress, flooding, waterlogging, increased salinity (for example, in the soil), increased exposure to one or more minerals, exposure to ozone, exposure to ultra-violet light, exposure to strong light, darkness (i.e. lack of light in general or short day length), limited availability of nutrients (for example, nitrogen nutrients and phosphorus nutrients). In particular, the stress factor is selected from cold temperature exposure, osmotic stress (i.e. lack of water), and increased salinity; most particularly the stress factor is cold temperature exposure or increased salinity (especially its affect upon germination).

In one aspect of the present invention, crop enhancements are made in the substantial absence of pressure from pests and/or diseases. For example, pests and/or diseases may be controlled by a pesticidal treatment that is applied prior to, or at the same time as, the method of the present invention.

In agricultural practice (insecticidal) seed treatment is often (mostly) applied with fungicides; in this respect, a compound of formula (I) may enable synergies in terms of disease protection. Abiotic stress alleviation may also confer improved tolerance to pathogens, thus helping fungicidal performance. In a similar manner, improved germination due to a compound of formula (I) may lead to improved seedling resistance to insect damage which in itself may lead to a reduced sensitivity to diseases. In summary crop enhancement due to a compound of formula (I) may also lead to a so-called knock-on effect regarding biotic stress alleviation.

Crops of useful plants on which the method of the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and Zoysia grass; herbs such as basil, borage, chives, coriander, lavender, lovage, mint, oregano, parsley, rosemary, sage and thyme; pulses; legumes for example beans, lentils, peas and soya beans; nuts for example almond, cashew, ground nut, hazelnut, peanut, pecan, pistachio and walnut; palms for example oil palm;

ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Preferably the crop is a cereal, a pulse, canola or corn; in particular wheat or corn, preferably wheat.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors. An example of a crop that has been rendered tolerant to imidazolinones, for example imazamox, by conventional methods of breeding is Clearfield® summer canola. Examples of crops that have been rendered tolerant to herbicides by genetic engineering methods include e.g. glyphosate- and glufosinate-resistant maize varieties commercially available under the trade names RoundupReady®, Herculex I® and LibertyLink®.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria. Examples of toxins which can be expressed include δ-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut® (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

A compound of formula (I) may be used in unmodified form, but it is generally formulated into a composition in various ways using formulation adjuvants, such as carriers, solvents and surface-active substances. The formulations can be in various physical forms, for example, in the form of dusting powders, gels, wettable powders, water-dispersible granules, water-dispersible tablets, effervescent pellets, emulsifiable concentrates, micro-emulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared for example by mixing a compound of formula (I) ('active ingredient') with formulation adjuvants in order to obtain compositions in the form of finely divided solids, granules, solutions, dispersions or emulsions. The active ingredient can also be formulated with other adjuvants, such as finely divided solids, mineral oils, oils of vegetable or animal origin, modified oils of vegetable or animal origin, organic solvents, water, surface-active substances or combinations thereof.

The active ingredient can also be contained in very fine microcapsules. Microcapsules contain the active ingredient in a porous carrier. This enables the active ingredient to be released into the environment in controlled amounts (for example, slow-release). Microcapsules usually have a diameter of from 0.1 to 500 microns. They contain the active ingredient in an amount of about from 25 to 95% by weight of the capsule weight. The active ingredient can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecyl-benzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the active ingredient to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, 10th Edition, Southern Illinois University, 2010.

The compositions generally comprise from 0.1 to 99% by weight, especially from 0.1 to 95% by weight, of the compound of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline the compound of formula I may be applied at a rate of from 1 to 2000 l/ha, especially from 10 to 1000 l/ha.

Preferred formulations can have the following compositions (weight %):

Emulsifiable Concentrates:
- active ingredient: 1 to 95%, preferably 60 to 90%
- surface-active agent: 1 to 30%, preferably 5 to 20%
- liquid carrier: 1 to 80%, preferably 1 to 35%

Dusts:
- active ingredient: 0.1 to 10%, preferably 0.1 to 5%
- solid carrier: 99.9 to 90%, preferably 99.9 to 99%

Suspension Concentrates:
- active ingredient: 5 to 75%, preferably 10 to 50%
- water: 94 to 24%, preferably 88 to 30%
- surface-active agent: 1 to 40%, preferably 2 to 30%

Wettable Powders:
- active ingredient: 0.5 to 90%, preferably 1 to 80%
- surface-active agent: 0.5 to 20%, preferably 1 to 15%
- solid carrier: 5 to 95%, preferably 15 to 90%

Granules:
- active ingredient: 0.1 to 30%, preferably 0.1 to 15%
- solid carrier: 99.5 to 70%, preferably 97 to 85%

The following Examples further illustrate, but do not limit, the invention.

| Wettable powders | a) | b) | c) |
|---|---|---|---|
| active ingredient | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredient | 25% | 50% | 75% |
| light mineral oil | 5% | 5% | 5% |
| highly dispersed silicic acid | 5% | 5% | — |
| Kaolin | 65% | 40% | — |
| Talcum | — | | 20 |

The combination is thoroughly mixed with the adjuvants and the mixture is thoroughly ground in a suitable mill, affording powders that can be used directly for seed treatment.

| Emulsifiable concentrate | |
|---|---|
| active ingredient | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |

-continued

| Emulsifiable concentrate | |
|---|---|
| Cyclohexanone | 30% |
| xylene mixture | 50% |

Emulsions ofany required dilution, which can be used in plant protection, can be obtained from this concentrate by dilution with water.

| Dusts | a) | b) | c) |
|---|---|---|---|
| active ingredient | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
|---|---|
| active ingredient | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
|---|---|
| active ingredient | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

Suspension Concentrate

| | |
|---|---|
| active ingredient | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Flowable Concentrate for Seed Treatment

| | |
|---|---|
| active ingredient | 40% |
| propylene glycol | 5% |
| copolymer butanol PO/EO | 2% |

-continued

| | |
|---|---|
| Tri styrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the compound of the invention are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredient. The medium capsule diameter is 8-15 microns. The resulting formulation is applied to seeds as an aqueous suspension in an apparatus suitable for that purpose.

The amount of an active ingredient to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic; or the application time.

When applied to the useful plants an active ingredient is typically applied at a rate of 5 to 2000 g a.i./ha, particularly 10 to 1000 g a.i./ha, e.g. 50, 75, 100 or 200 g a.i./ha.

In agricultural practice the application rates of an active ingredient depend on the type of effect desired, and typically range from 20 to 4000 g of total composition per hectare.

The timing of application of a composition to the useful plants or their locus will depend on the crop type and the crop enhancement required. For example, a compound of formula (I) may be applied before an expected drought to provide protection from its effects or at a particular plant growth stage to provide a protective effect and/or preserve/enhance yield in the presence of stress. In wheat, for example, a compound of formula (I) may be applied during stem elongation or booting and up to the middle of heading (at or between BBCH 30-55). In soybean, for example, a compound of formula (I) may be applied at or between growth stages R1 and R3.

When a composition is used for treating seed, rates of 0.001 to 50 g of a compound of formula I per kg of seed, preferably from 0.01 to 10 g per kg of seed, are generally sufficient.

Suitably, a compound of formula (I) is applied at seeding as a seed or soil treatment.

Normally, in the management of a crop a grower would use one or more other agronomic chemicals in addition to the compound of the present invention. Examples of agronomic chemicals include pesticides, such as acaricides, bactericides, fungicides, herbicides, insecticides, nematicides, as well as plant nutrients and plant fertilizers. Accordingly, the present invention also provides for the use of a compound of formula (I) together with one or more pesticides, plant nutrients or plant fertilizers. The combination may also encompass specific plant traits incorporated into the plant using any means, for example conventional breeding or genetic modification.

Suitable examples of plant nutrients or plant fertilizers are calcium sulfate ($CaSO_4$), calcium nitrate ($Ca(NO_3)_2 \cdot 4H_2O$), calcium carbonate ($CaCO_3$), potassium nitrate ($KNO_3$), magnesium sulfate ($MgSO_4$), potassium hydrogen phosphate ($KH_2PO_4$), manganese sulfate ($MnSO_4$), copper sulfate ($CuSO_4$), zinc sulfate ($ZnSO_4$), nickel chloride ($NiCl_2$), cobalt sulfate ($CoSO_4$), potassium hydroxide (KOH), sodium chloride (NaCl), boric acid ($H_3BO_3$) and metal salts thereof ($Na_2MoO_4$). The nutrients may be present in an amount of 5% to 50% by weight, preferably of 10% to 25% by weight or of 15% to 20% by weight each. Preferred additional nutrients are urea ($(NH_2)_2CO$), melamine ($C_3H_6N_6$), potassium oxide ($K_2O$), and inorganic nitrates. The most preferred additional plant nutrient is potassium oxide. Where the preferred additional nutrient is urea, it is present in an amount of generally 1% to 20% by weight, preferably 2% to 10% by weight or of 3% to 7% by weight.

A compound of formula (I) may also be used in combination with one or more of the following crop enhancement compounds:

Plant growth regulators including: abscisic acid, amino-ethoxyvinyl glycine, ancymidol, butralin, carbaryl, chlormequat, chlorphonium, chlorpropham, cyclanilide, daminozide, dikegulac, dimethipin, ethephon, flumetralin, flurprimidol, fluoridamid, forchlorfenuron, fosamine, gibberellic acid, glyphosine, isopyrimol, jasmonic acid, maleic hydrazide, mefluidide, mepiquat, methylcyclopropene, paclobutrazol, piproctanyl, prohexadione, prohexadione-calcium, prohydrojasmon, propham, tetcyclacis, thidiazuron, tributyl phosphorotrithioate, tiaojiean, trinexapac, trinexapac-ethyl, 2,3,5-tri-iodobenzoic acid, uniconzole.

Plant activators including: acibenzolar, acibenzolar-S-methyl, chitosan, probenazole, *Reynoutria sachalinensis* extract, tiadinil.

Plant hormones including: abscisic acid (ABA), auxins (4-CPA, 2,4-D, 2,4-DB, 2,4-DEP, dichlorprop, fenoprop, indole-3-acetic acid (IAA), indole-3-butyric acid (IBA), 1-naphthaleneacetic acid (NAA), 1-naphthol, tryptophan), brassinosteroids, cytokinins (1,3-diphenyl urea, 2iP, 4-hydroxyphenethyl alcohol, adenine, benzyladenine, kinetin, thidiazuron, zeatin), ethylene, ethylene inhibitors (1-methylcyclopropene, aviglycine), ethylene releasers (ACC, etacelasil, ethephon, glyoxime), gibberellin (GA1, GA2, gibberellic acid GA3, GA4, GA5, GA6, GA7, GA8, GA9, GA10, GA11, GA12, GA13, GA14, GA15, GA16, GA17, GA18, GA19, GA20, GA21, GA22, GA23, GA24, GA25, GA26, GA27, GA28, GA29, GA30, GA31, GA32, GA33, GA34, GA35, GA36, GA37, GA38, GA39, GA40, GA41, GA42, GA43, GA44, GA45, GA46, GA47, GA48, GA49, GA50, GA51, GA52, GA53, GA54, GA55, GA56, GA57, GA58, GA59, GA60, GA61, GA62, GA63, GA64, GA65, GA66, GA67, GA68, GA69, GA70, GA71, GA72, GA73, GA74, GA75, GA76, GA77, GA78, GA79, GA80, GA81, GA82, GA83, GA84, GA85, GA86, GA87, GA88, GA89, GA90, GA91, GA92, GA93, GA94, GA95, GA96, GA97, GA98, GA99, GA100, GA101, GA102, GA103, GA104, GA105, GA106, GA107, GA108, GA109, GA110, GA111, GA112, GA113, GA114, GA115, GA116, GA117, GA118, GA119, GA120, GA121, GA122, GA123, GA124, GA125, GA126, GA127, GA128, GA129, GA130, GA131, GA132, GA133, GA134, GA135, GA136), jasmonates (jasmonic acid, methyl jasmonate), salicylates (salicylic acid), strigolactones (GR24, strigol, strigyl acetate, orobanchol, orobanchyl acetate, deoxystrigol, sorgolactone).

Defoliants including: calcium cyanamide, dimethipin, endothal, ethephon, merphos, metoxuron, pentachlorophenol, thidiazuron, tribufos.

Nutrition adapters including: fertilisers (nitrogen, phosphorous, potassium), macronutrients (calcium, magnesium, sulfur), micronutrients (boron, copper, iron, chloride, manganese, molybdenum, zinc), non-essential nutrients (cobalt, silicon, nickel), amino acids (Isabion®, Quantis®, Hyt®), iron chelate (Sequestrene®), nitrogen fixing bacteria (*Rhizobium*), phosphorous solubilizing bacteria (*Penicillium bilaii* (JumpStart®)).

Pesticides with secondary crop enhancement effects: azoxystrobin, difenoconazole, isopyrazam, pyraclostrobin, sedaxane, thiamethoxam, trinexapac-ethyl.

Other crop enhancement compounds including: growth stimulators (24-epi brassinolide, 28-homobrassinolide, brassinolide, brassinolide-ethyl, DCPTA, forchlorfenuron, hymexazol, prosuler, pyripropanol, triacontanol), karrikins (KAR1, KAR2, KAR3, KAR4), lipo-chitooligosaccharides, polyamines, unclassified plant growth regulators (2,4,5-T, 2-hydrazinoethanol, bachmedesh, benzofluor, buminafos, carvone, chlorfluren, chlorflurenol, choline chloride, ciobutide, clofencet, clofibric acid, cloprop, cloxyfonac, cyanamide, cyclanilide, cycloheximide, cyprosulfamide, dichlorflurenol, dimexano, epocholeone, ethylchlozate, fenridazon, flurenol, fuphenthiourea, furalane, heptopargil, hexafluoroacetone trihydrate, holosulf, inabenfide, isoprothiolane, karetazan, lead arsenate, MCPB, methasulfocarb, pydanon, sintofen, tecnazene, triapenthenol).

The term "fungicide" as used herein means a compound that controls, modifies, or prevents the growth of fungi. The term "fungicidally effective amount" means the quantity of such a compound or combination of such compounds that is capable of producing an effect on the growth of fungi. Controlling or modifying effects include all deviation from natural development, such as killing, retardation and the like, and prevention includes barrier or other defensive formation in or on a plant to prevent fungal infection.

The term "herbicide" as used herein means a compound that controls or modifies the growth of plants. The term "herbicidally effective amount" means the quantity of such a compound or combination of such compounds that is capable of producing a controlling or modifying effect on the growth of plants. Controlling or modifying effects include all deviation from natural development, for example killing, retardation, leaf burn, albinism, dwarfing and the like.

The term "insecticide" as used herein means a compound that controls or modifies the growth of insects. The term "insecticidally effective amount" means the quantity of such a compound or combination of such compounds that is capable of killing, controlling, or infecting insects, retarding the growth or reproduction of insects, reducing an insect population, and/or reducing damage to plants caused by insects.

The term "nematicide" as used herein means a compound that controls or modifies the growth of nematodes. The term "nematicidally effective amount" means the quantity of such a compound or combination of such compounds that is capable of killing, controlling, or infecting nematodes, retarding the growth or reproduction of nematodes, reducing a nematode population, and/or reducing damage to plants caused by nematodes.

The term "locus" as used herein means fields in or on which plants are growing, or where seeds of cultivated plants are sown, or where seed will be placed into the soil. It includes soil, seeds, and seedlings, as well as established vegetation.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

Pesticidal agents referred to herein using their common name are known, for example, from "The Pesticide Manual", 15th Ed., British Crop Protection Council 2009.

Various aspects and embodiments of the present invention will now be illustrated in more detail by way of example and the following Examples:

EXAMPLE 1

This example illustrates that isocycloseram displays a consistent effect on corn seed germination kinetics under low temperature (15° C.).

Corn seeds (var. NK Falkone, Syngenta Seeds SAS, St. Sauveur, France) were sorted by size using a sieve to eliminate round seeds. The corn seeds were placed in 24 well plates (1 seed per well; each plate was considered as one experimental unit or replicate). Germination was initiated by the addition of 250 μl of distilled water containing 0.5% dimethyl sulfoxide (DMSO) to each well (with isocycloseram present at a concentration of either 1, 5, 25 or 125 μM). 8 replicates (i.e. 8 plates) were used for each treatment characterisation. The plates were sealed using seal foil (Polyolefin Art. Nr. 900320) from HJ-BIOANALYTIK. All plates were placed in a climatic chamber at either 15° C. or 23° C., with 60% Relative Humidity. The experiment was laid out in a completely randomized design.

Germination was followed over time by taking photographs at different time points. Image analysis was performed automatically with a macro which was developed using the Image J software. A kinetic analysis of germination was carried out by fitting a trend curve. Three parameters were calculated from the trend curve: the T50 (time taken for 50% germination; related to speed of germination); the slope of the curve (the uniformity of germination) and the plateau (the total percentage of germinated seeds).

Treatment with isocycloseram (1, 5, 25 and 125 μM) resulted in significant changes in germination rate and uniformity, especially under the colder conditions and higher concentrations, indicating an unexpected effect of isocycloseram. The results are expressed in terms of percentage in comparison to the control (untreated seeds) for each temperature group respectively. The results were analysed statistically to highlight significant differences ($p<0.05$). (Key: Sign.=significance; ns=not significant)

TABLE 1

Corn germination test at 23° C. (normal conditions)

| Isocycloseram concentration | Treatment: Time taken to reach 50% germination of corn — Relative T50 | LSD | Sign. | Uniformity of Germination (slope of the curve) — Relative slope | LSD | Sign. | Plateau of Germination (total percentage of germinated seeds) — total % of germinated seeds | LSD | Sign. |
|---|---|---|---|---|---|---|---|---|---|
| Untreated | 100 | | | 100 | | | 100 | | |
| 1 μM | 107.32 | 3.6 | Slower | 80.22 | 16.25 | less uniform | 103.63 | 4.36 | ns |
| 5 μM | 105.17 | 3.6 | Slower | 93.8 | 16.25 | ns | 103.63 | 4.36 | ns |
| 25 μM | 95.22 | 3.6 | Faster | 133.81 | 16.25 | more uniform | 105.39 | 4.36 | higher |
| 125 μM | 92.47 | 3.6 | Faster | 176.64 | 16.25 | more uniform | 100.7 | 4.36 | ns |

TABLE 2

Corn Germination test at 15° C. (cold conditions)

| Isocycloseram concentration | Treatment: Time taken to reach 50% germination of corn — Relative T50 | LSD | Sign. | Uniformity of Germination (slope of the curve) — Relative slope | LSD | Sign. | Plateau of Germination (total percentage of germinated seeds) — total % of germinated seeds | LSD | Sign. |
|---|---|---|---|---|---|---|---|---|---|
| Untreated | 100 | | | 100 | | | 100 | | |
| 1 μM | 99.67 | 2.84 | ns | 100 | 17.0 | ns | 103 | 4.5 | ns |

TABLE 2-continued

Corn Germination test at 15° C. (cold conditions)

| | Treatment | | | | | | | | |
|---|---|---|---|---|---|---|---|---|---|
| | Time taken to reach 50% germination of corn | | | Uniformity of Germination (slope of the curve) | | | Plateau of Germination (total percentage of germinated seeds) | | |
| Isocycloseram concentration | Relative T50 | LSD | Sign. | Relative slope | LSD | Sign. | total % of germinated seeds | LSD | Sign. |
| 5 μM | 101.73 | 2.84 | ns | 98 | 17.0 | ns | 105 | 4.5 | higher |
| 25 μM | 93.1 | 2.84 | Faster | 233 | 17.0 | more uniform | 106 | 4.5 | higher |
| 125 μM | 90.61 | 2.84 | Faster | 191 | 17.0 | more uniform | 105 | 4.5 | higher |

All three parameters have a high agronomical relevance. Significant differences between treated seeds and untreated control are given at $p<0.05$ (Anova). T50 corresponds to the time needed for half of the seed population to germinate; lower values indicate faster germination. Slope indicates how synchronous the germination of the seed population is; values greater than 100 indicate a steeper curve. The steeper the curve, the better and more uniform the germination is. Under both normal and cold conditions, the homogeneity of germination expressed as the slope of the curve at the two highest rates, 25 and 125 μM was significantly better than the untreated control. Under cold conditions, the total amount of germinated seeds (plateau) was significantly improved for the three highest concentrations. At the two highest rates, the speed of germination (T50) was faster at both temperatures, indicating a positive impact on germination speed.

EXAMPLE 2

This example illustrates that isocycloseram displays a consistent effect on wheat seed germination kinetics under increased salinity (i.e. under salt stress).

Wheat seeds (winter wheat variety Syllon, Syngenta Seeds) were placed in 24 well plates (1 seed per well, each plate was considered as one experimental unit or replicate). Germination under salt stress was measured at different concentrations in the well plates and found to be significantly slowed down by 5-10% with higher T50 germination values, at 200 μl of 12.5 mM NaCl solution containing 0.5% DMSO per well. Subsequently, a salt solution was prepared at this concentration and spiked with the test compound at different rates as shown below in Table 3, and the germination test was repeated under salt stress. Eight replicates (i.e. 8 plates) were used for each treatment. Plates were sealed with seal foil (Polyolefin Art. Nr. 900320) from HJ-BIOANALYTIK. All plates were placed in a climatic chamber at 23° C. with 70% Relative Humidity. The experiment was laid out in a completely randomized design.

Germination was followed over time by taking photographs at different time points. Image analysis was performed automatically with a macro which was developed using the Image J software. A kinetic analysis of germination was carried out by fitting a trend curve. Three parameters were calculated from the trend curve: the T50 (time taken for 50% germination; speed of germination); the slope of the curve (the uniformity of germination) and the plateau (the total percentage of germinated seeds).

The treatments with isocycloseram at 3 concentrations 1, 5, and 25 μM resulted in significant changes in germination speed, indicating an unexpected effect of isocycloseram. The results are expressed in terms of percentage in comparison to the check (untreated seeds) and the results are analysed statistically to highlight significant differences ($p<0.05$). (Key: Sign.=significance)

TABLE 3

Winter wheat variety Syllon: germination under increased salinity

| Treatment | Abiotic Stress Factor: increased salinity | Time taken to reach 50% germination of wheat | | |
|---|---|---|---|---|
| Isocycloseram concentration | Salt NaCl solution | Relative T50 | LSD | Sign. |
| Untreated | 12.5 mM | 100 | / | / |
| 1 μM | 12.5 mM | 95.27 | 4.3 | Faster |
| 5 μM | 12.5 mM | 94.70 | 4.3 | Faster |
| 25 μM | 12.5 mM | 93.07 | 4.3 | Faster |

T50 corresponds to the time needed for half of the seed population to germinate and is a germination parameter of high agronomical relevance. Significant differences between treated seeds and untreated control are given at $p<0.05$ (Anova). Lower values indicate faster germination.

Under salt stress/increasing salinity conditions, the germination speed expressed as T50 at the three rates 1, 5 and 25 μM was significantly better than the untreated control, indicating a positive impact on germination speed under salt stress conditions.

The invention claimed is:

1. A method of enhancing a plant by increasing resistance to an abiotic stress factor, comprising:

identifying a plant propagation material or a plant growing locus for the plant propagation material exhibiting or susceptible to the abiotic stress factor; and applying to the plant propagation material or the plant growing locus, an effective amount of an active ingredient of a compound of formula (Ia), or any isomer thereof (Ia)

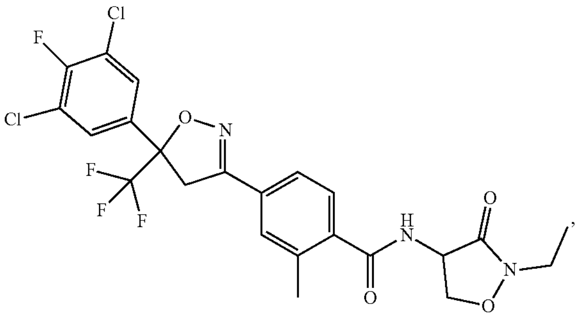

, or a composition comprising the compound of formula (Ia); wherein the abiotic stress factor is cold temperature exposure or increased salinity.

2. The method according to claim 1, wherein the plant is a cereal, a pulse, canola or corn.

3. The method according to claim 1, wherein the plant is wheat.

4. The method according to claim 3, wherein the compound of formula (Ia) is applied at seeding as a seed or soil treatment.

5. The method according to claim 1, wherein the plant is corn.

6. The method according to claim 1, wherein the plant is a crop of transgenic plants.

7. The method according to claim 1, wherein the compound of formula (Ia) is applied before the appearance of a stress factor.

8. The method according to claim 1, where the compound of formula (Ia) is isocycloseram.

9. The method according to claim 8, wherein the compound of formula (Ia) or the composition thereof is applied to corn seeds under low temperature.

10. The method according to claim 8, wherein the compound of formula (Ia) or the composition thereof is applied to wheat seeds under increased salinity.

11. The method according to claim 1, wherein the cold condition is about 15° C.

12. The method according to claim 1, wherein the plant propagation material germinates in cold conditions at a T50 of about 90.61%-93.1% compared to an untreated plant propagation material.

13. The method according to claim 1, wherein the plant propagation material germinates in cold conditions with a uniformity of about 191%-233% compared to an untreated plant propagation material.

14. The method according to claim 1, wherein the plant propagation material germinates in cold conditions at a rate of about 105%-106% compared to an untreated plant propagation material.

15. The method according to claim 1, wherein the salinity is about 12.5 mM.

16. The method according to claim 1, wherein the plant propagation material germinates in increased salinity at a T50 of about 95.27%-93.07% compared to an untreated plant propagation material.

17. The method according to claim 1, wherein the compound of formula (Ia) is applied at a concentration of about 25-125 μM.

18. The method according to claim 1, wherein the compound of formula (Ia) is the sole active ingredient to increase resistance said abiotic stress factor.

* * * * *